(12) United States Patent
Wang et al.

(10) Patent No.: US 10,982,890 B2
(45) Date of Patent: Apr. 20, 2021

(54) AIR CONDITIONER, AND DEVICE AND METHOD FOR PREVENTING COLD AIR DURING HEATING OF AIR CONDITIONER

(71) Applicant: GREE ELECTRIC APPLIANCES, INC. OF ZHUHAI, Guangdong (CN)

(72) Inventors: Mei Wang, Guangdong (CN); Yigeng Liang, Guangdong (CN); Wuzhan Ye, Guangdong (CN); Haiyuan Jin, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 78 days.

(21) Appl. No.: 16/345,460

(22) PCT Filed: Sep. 25, 2017

(86) PCT No.: PCT/CN2017/103141
§ 371 (c)(1),
(2) Date: Apr. 26, 2019

(87) PCT Pub. No.: WO2018/076981
PCT Pub. Date: May 3, 2018

(65) Prior Publication Data
US 2019/0271495 A1  Sep. 5, 2019

(30) Foreign Application Priority Data
Oct. 28, 2016  (CN) .......................... 201610973252.1

(51) Int. Cl.
*F25B 49/02* (2006.01)
*F25B 13/00* (2006.01)
(Continued)

(52) U.S. Cl.
CPC ............ *F25B 49/025* (2013.01); *F24F 11/30* (2018.01); *F24F 11/77* (2018.01); *F25B 13/00* (2013.01);
(Continued)

(58) Field of Classification Search
CPC .. F25B 49/025; F25B 13/00; F25B 2600/112; F25B 2700/2104; F25B 2700/2106;
(Continued)

(56) References Cited

FOREIGN PATENT DOCUMENTS

| CN | 101135488 A | 3/2008 |
|---|---|---|
| CN | 102563806 A | 7/2012 |

(Continued)

OTHER PUBLICATIONS

CN-103307697-A Translation (Year: 2013).*

(Continued)

*Primary Examiner* — Marc E Norman
*Assistant Examiner* — Schyler S Sanks
(74) *Attorney, Agent, or Firm* — Armstrong Teasdale LLP (57) ABSTRACT

An air conditioner, and a device and method for preventing cold air during heating of the air conditioner are provided, including: detecting an indoor ambient temperature and an outdoor ambient temperature respectively; determining whether an evaporator inner-tube temperature satisfies an evaporator inner-tube temperature condition, or whether a duration reaches an operating duration, or whether a current intensity continuously reaches a first preset current intensity threshold for a predetermined duration; when if so, starting an inner blower fan at a first preset wind speed; determining whether the evaporator inner-tube temperature satisfies the evaporator inner-tube temperature condition, or whether the current intensity continuously reaches a second preset current intensity threshold for a predetermined duration, or whether a duration, for which the inner blower fan operates (Continued)

at the first preset wind speed, reaches a first preset duration; and if so, switching the inner blower fan to operate at a second preset wind speed.

12 Claims, 5 Drawing Sheets

(51) Int. Cl.
*F24F 11/77* (2018.01)
*F24F 11/30* (2018.01)
*F24F 110/12* (2018.01)
*F24F 110/10* (2018.01)

(52) U.S. Cl.
CPC ....... *F24F 2110/10* (2018.01); *F24F 2110/12* (2018.01); *F25B 2600/112* (2013.01); *F25B 2700/2104* (2013.01); *F25B 2700/2106* (2013.01); *F25B 2700/2117* (2013.01)

(58) Field of Classification Search
CPC .... F25B 2700/2117; F24F 11/77; F24F 11/30; F24F 2110/10; F24F 2110/12
See application file for complete search history.

(56) References Cited

FOREIGN PATENT DOCUMENTS

| | | | |
|---|---|---|---|
| CN | 103307697 A | * | 9/2013 |
| CN | 103982979 A | * | 8/2014 |
| CN | 105042771 A | | 11/2015 |
| CN | 105066353 A | | 11/2015 |
| CN | 105757886 A | | 7/2016 |
| CN | 106568170 A | | 4/2017 |
| JP | H1026386 A | | 1/1998 |
| JP | H07159008 A | | 1/1998 |
| JP | 2014190640 A | | 10/2014 |
| KR | 20020015561 A | | 8/2002 |

OTHER PUBLICATIONS

CN-103982979-A Translation (Year: 2014).*
International Search Report issued in International Application No. PCT/CN2017/103141, dated Dec. 29, 2017, 2 pages.
European Search Report issued in corresponding European Application No. 17863765.8, dated Apr. 8, 2020, 6 pages.

* cited by examiner

AIR CONDITIONER, AND DEVICE AND METHOD FOR PREVENTING COLD AIR DURING HEATING OF AIR CONDITIONER

The present disclosure is the national stage entry of International Patent Application No. PCT/CN2017/103141, filed on Sep. 25, 2017, entitled "Air Conditioner, Device and Method for Cold Air Prevention During Heating for Air Conditioner", which claims the benefit of priority to Chinese Patent Application No. 201610973252.1, filed to the China Patent Office on Oct. 28, 2016, entitled "Air Conditioner, and Device and Method for Preventing Cold Air During Heating on Air Conditioner", the contents of which are hereby incorporated by reference in their entirety.

TECHNICAL FIELD

The present disclosure relates to the technical field of electrical appliances, and in particular to an air conditioner, and a device and method for preventing cold air during heating of the air conditioner.

BACKGROUND

In the initial stage of heating of an air conditioner, because the temperature of an indoor heat exchanger is low, in order to prevent blowing cold air by the air conditioner, it is usually controlled by delaying the starting of a blower fan. Since the blower fan is not started, an indoor side high pressure rises faster after an air conditioning system operates for heating, and the temperature of the indoor heat exchanger will also rise faster. When the temperature of the indoor heat exchanger sensor reaches a set temperature, or a delay time reaches a set value, the blower fan will be started, which is called anti-cold air control.

The existing method for preventing cold air during heating simply adopts an air conditioner evaporator tube temperature condition as the basis for starting the anti-cold air control (i.e., an inner blower fan is started), cannot accurately determine the load of a system. Especially in the case of low load, the time of entering the anti-cold air control cannot be adjusted, it cannot be ensured that first outlet air is hot air, and the optimal comfort experience cannot be met. Secondly, the existing method for preventing cold air during heating has no current intensity determination condition, and cannot determine the system abnormality, which is likely to result in overpressure in the case of system failure, and to cause safety hazards; and moreover, the existing method for preventing cold air lacks intelligent determination on the operation of the air deflector and the inner blower fan, and the comfortable user experience when the air deflector is aligned and the optimal time for exiting cold air prevention cannot be ensured.

In summary, it is necessary to propose a solution for preventing cold air during heating for an air conditioner to solve the above problems.

SUMMARY

According to a first aspect of the present disclosure, a device for preventing cold air during heating on an air conditioner is provided, including: a temperature detecting element, configured to detect, after heating is started, an indoor ambient temperature and an outdoor ambient temperature respectively to determine a general temperature range within which the indoor ambient temperature and the outdoor ambient temperature are located; a first determining element, configured to, determine whether an evaporator inner-tube temperature satisfies an evaporator inner-tube temperature condition required for entering a cold air prevention mode corresponding to the general temperature range within which the indoor ambient temperature and the outdoor ambient temperature are located, or determine whether a duration, for which a compressor and a four-way valve operate, reaches an operating duration of the compressor and the four-way valve, required for entering the cold air prevention mode corresponding to the general temperature range within which the indoor ambient temperature and the outdoor ambient temperature are located, or determine whether a current intensity continuously reaches a first preset current intensity threshold for a predetermined duration; a first controlling element, configured to start, when any one determining result of the first determining element is yes, an inner blower fan at a first preset wind speed; a second determining element, configured to determine, after the inner blower fan is started, whether the evaporator inner-tube temperature satisfies the evaporator inner-tube temperature condition required for exiting the cold air prevention mode corresponding to the general temperature range within which the indoor ambient temperature and the outdoor ambient temperature are located, or determine whether the current intensity continuously reaches a second preset current intensity threshold for a predetermined duration, or determine whether a duration, for which the inner blower fan operates at the first preset wind speed, reaches a first preset duration; and a second controlling element, configured to switch, when any one determining result of the second determining element is yes, the inner blower fan to operate at a second preset wind speed, the first preset wind speed being smaller than the second preset wind speed.

According to at least one alternative embodiment, the device further including: a setting element, configured to set a plurality of general temperature ranges, the setting element being further configured to: set a plurality of indoor ambient temperature ranges and a plurality of outdoor ambient temperature ranges, and set each indoor ambient temperature range to correspond to different outdoor ambient temperature ranges respectively to form the plurality of general temperature ranges.

According to at least one alternative embodiment, the temperature detecting element is further configured to: detect the indoor ambient temperature and the outdoor ambient temperature after starting up for a predetermined delay time.

According to at least one alternative embodiment, the device further including: a third controlling element, configured to drive, after heating is started, an air deflector to a first preset position.

According to at least one alternative embodiment, the third controlling element is further configured to: drive, after the inner blower fan is started, the air deflector to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or the current intensity continuously reaches a second preset current intensity threshold for a predetermined duration, or a duration, for which the inner blower fan operates at the first preset wind speed, reaches a second preset duration.

According to a second aspect of the present disclosure, a method for preventing cold air during heating on an air conditioner is provided, including: after heating is started, detecting an indoor ambient temperature and an outdoor ambient temperature respectively to determine a general temperature range within which the indoor ambient temperature and the outdoor ambient temperature are located; determining whether an evaporator inner-tube temperature satisfies an evaporator inner-tube temperature condition required for entering a cold air prevention mode corresponding to the general temperature range within which the indoor ambient temperature and the outdoor ambient temperature are located, or determining whether a duration, for which a compressor and a four-way valve operate, reaches an operating duration of the compressor and the four-way valve, required for entering the cold air prevention mode corresponding to the general temperature range within which the indoor ambient temperature and the outdoor ambient temperature are located, or determining whether a current intensity continuously reaches a first preset current intensity threshold for a predetermined duration; when any one determining result is yes, starting an inner blower fan at a first preset wind speed; after the inner blower fan is started, determining whether the evaporator inner-tube temperature satisfies the evaporator inner-tube temperature condition required for exiting the cold air prevention mode corresponding to the general temperature range within which the indoor ambient temperature and the outdoor ambient temperature are located, or determining whether the current intensity continuously reaches a second preset current intensity threshold for a predetermined duration, or determining whether a duration, for which the inner blower fan operates at the first preset wind speed, reaches a first preset duration; and if so, switching the inner blower fan to operate at a second preset wind speed, the first preset wind speed being smaller than the second preset wind speed.

According to at least one alternative embodiment, the method further including: setting a plurality of general temperature ranges, including: setting a plurality of indoor ambient temperature ranges and a plurality of outdoor ambient temperature ranges, and setting each indoor ambient temperature range to correspond to different outdoor ambient temperature ranges respectively to form the plurality of general temperature ranges.

According to at least one alternative embodiment, the indoor ambient temperature and the outdoor ambient temperature are detected after starting up for a predetermined delay time.

According to at least one alternative embodiment, the method further including: driving, after heating is started, an air deflector to a first preset position.

According to at least one alternative embodiment, the method further including: driving, after the inner blower fan is started, the air deflector to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or it is continuously detected, within a predetermined duration, that the current intensity reaches a second preset current intensity threshold, or a duration, for which the inner blower fan operates at the first preset wind speed, reaches a second preset duration.

According to a third aspect of the present disclosure, an air conditioner is provided, including any one of the above devices.

According to the above solution of the present disclosure, the timing of entering a cold air prevention mode is determined, by integrating conditions such as an evaporator inner-tube temperature, a compressor operating time and current intensity, according to a general temperature range within which an indoor ambient temperature and an outdoor ambient temperature are located, the timing of entering the cold air prevention mode of a system, a system pressure and an outlet air temperature are optimized, and the comfort of first outlet air under a heating mode is ensured. By taking the current intensity as a determining condition for entering the cold air prevention mode, safety hazards caused by system overpressure when the system is abnormal in the stage of cold air prevention can be avoided. Moreover, the timing of exiting the cold air prevention mode and the timing of aligning an air deflector are determined by integrating the conditions such as the evaporator inner-tube temperature, the compressor operating time and the current intensity, and a comfortable heating experience can be provided for a user.

The above description is only an overview of the technical solutions of the present disclosure, and the technical means of the present disclosure can be more clearly understood and can be implemented in accordance with the contents of the specification. Hereinafter, the preferred embodiments of the present disclosure will be described in detail with reference to the accompanying drawings.

BRIEF DESCRIPTION OF THE DRAWINGS

The accompanying drawings, which constitute a part of the present disclosure, are used to provide a further understanding of the present disclosure, and the exemplary embodiments of the present disclosure and the description thereof are used to explain the present disclosure, but do not constitute improper limitations to the present disclosure. In the drawings.

DETAILED DESCRIPTION OF THE EMBODIMENTS

In order to make the objectives, technical solutions and advantages of the present disclosure clearer, the technical solutions of the present disclosure will be clearly and completely described hereinbelow with specific embodiments of the present disclosure and the corresponding drawings. It is apparent that the described embodiments are only part of the embodiments of the present disclosure, not all of the embodiments. On the basis of the embodiments of the present disclosure, all other embodiments obtained on the premise of no creative work of those of ordinary skill in the art fall within the scope of protection of the present disclosure.

Firstly, an air conditioner and a device for preventing cold air during heating for an air conditioner according to the present disclosure will be described with reference to the accompanying drawings.

Figure 1:
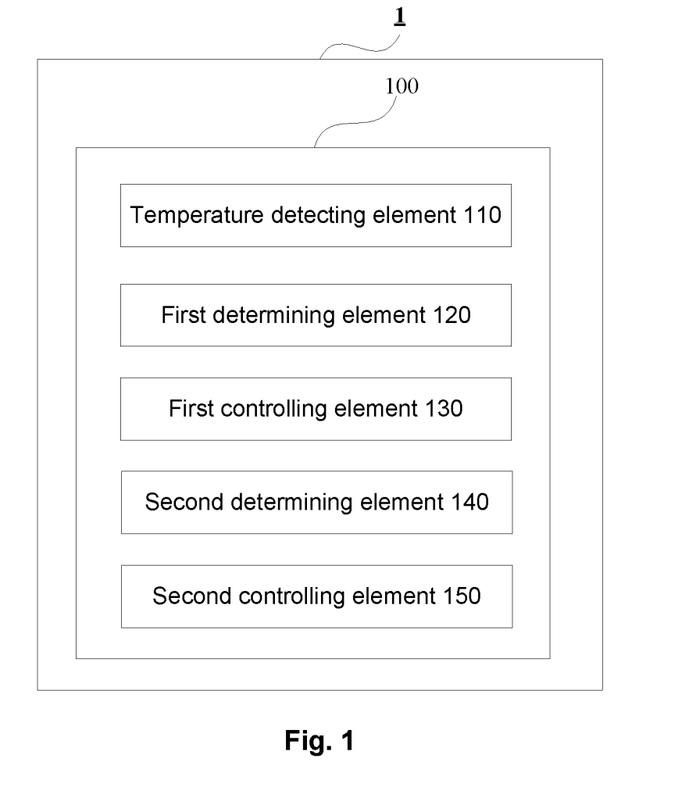
FIG. 1 is a structure block diagram of an air conditioner, and a device for preventing cold air during heating of the air conditioner according to an embodiment of the present disclosure.

FIG. 1 is a structure block diagram of an air conditioner, and a device for preventing cold air during heating of the air conditioner according to an embodiment of the present disclosure. As shown in FIG. 1, an air conditioner 1 includes a device 100 for preventing cold air during heating. The device 100 for preventing cold air during heating includes a temperature detecting element 110, a first determining element 120, a first controlling element 130, a second determining element 140, and a second controlling element 150.

The temperature detecting element 110 is configured to detect, after heating is started, an inner-tube temperature and an outdoor ambient temperature respectively to determine a general temperature range within which the inner-tube temperature and the outdoor ambient temperature are located.

As at least one alternative embodiment, the temperature detecting element 110 may detect an outdoor ambient temperature by an outer ring thermal bulb of the air conditioner. For example, variable frequency air conditioners generally have an outer ring thermal bulb for measuring the outdoor ambient temperature. As another alternative embodiment, the temperature detecting element 110 detects a condenser intermediate temperature, and uses the condenser intermediate temperature as the outdoor ambient temperature. Since the condenser intermediate temperature is close to the outdoor ambient temperature at the time of starting up, for an air conditioner without an outer ring thermal bulb, the condenser intermediate temperature can be used as the outdoor ambient temperature. For example, for a fixed-frequency air conditioner without an outer ring thermal bulb, the condenser intermediate temperature may be detected as the outdoor ambient temperature. The condenser intermediate temperature may be measured by a thermal bulb.

The temperature detecting element 110 detects the indoor ambient temperature and the outdoor ambient temperature after starting up for a predetermined delay time, so as to avoid the impact of a compressor phase current, and prevent a program from entering incorrectly. When the temperature detecting element 110 detects that the indoor ambient temperature and the outdoor ambient temperature are respectively located within an indoor ambient temperature range and an outdoor ambient temperature range corresponding to any one general temperature range, it is determined that the indoor ambient temperature and the outdoor ambient temperature are located within the general temperature range. Further, the device may further include a setting element (not shown in Figure), configured to preset multiple general temperature ranges. As at least one alternative embodiment, the setting element is configured to set multiple indoor ambient temperature ranges and multiple outdoor ambient temperature ranges, and set each indoor ambient temperature range to correspond to different outdoor ambient temperature ranges respectively to form the multiple general temperature ranges.

As at least one alternative embodiment, the indoor ambient temperature range is set as a first temperature range, a second temperature range, and a third temperature range, respectively, the outdoor ambient temperature range is set as a fourth temperature range, a fifth temperature range and a sixth temperature range, respectively, and the formed multiple general temperature ranges are a first range, a second range, a third range, a fourth range, a fifth range, a sixth range, a seventh range, an eighth range, and a ninth range, respectively.

Corresponding to the first range, the indoor ambient temperature range is within the first temperature range, and the outdoor ambient temperature range is within the fourth temperature range.

Corresponding to the second range, the indoor ambient temperature range is within the second temperature range, and the outdoor ambient temperature range is within the fourth temperature range.

Corresponding to the third range, the indoor ambient temperature range is within the third temperature range, and the outdoor ambient temperature range is within the fourth temperature range.

Corresponding to the fourth range, the indoor ambient temperature range is within the first temperature range, and the outdoor ambient temperature range is within the fifth temperature range.

Corresponding to the fifth range, the indoor ambient temperature range is within the second temperature range, and the outdoor ambient temperature range is within the fifth temperature range.

Corresponding to the sixth range, the indoor ambient temperature range is within the third temperature range, and the outdoor ambient temperature range is within the fifth temperature range.

Corresponding to the seventh range, the indoor ambient temperature range is within the first temperature range, and the outdoor ambient temperature range is within the sixth temperature range.

Corresponding to the eighth range, the indoor ambient temperature range is within the second temperature range, and the outdoor ambient temperature range is within the sixth temperature range.

Corresponding to the ninth range, the indoor ambient temperature range is within the third temperature range, and the outdoor ambient temperature range is within the sixth temperature range.

Figure 2:
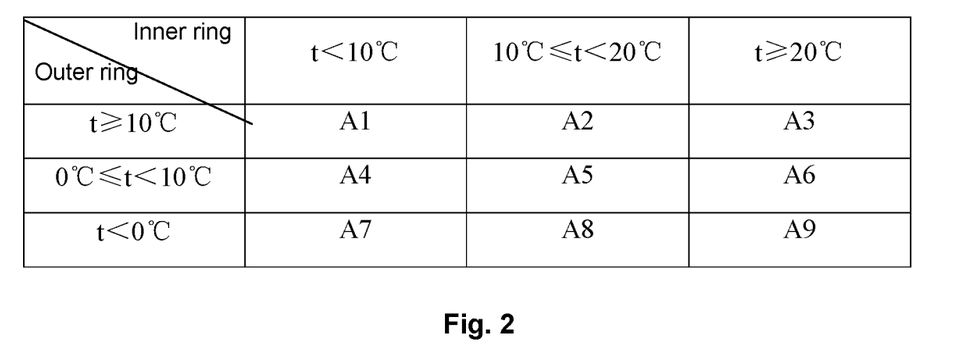
FIG. 2 is a table showing a correspondence between different indoor ambient temperature ranges and outdoor ambient temperature ranges corresponding to different general temperature ranges according to a specific embodiment of the present disclosure.

FIG. 2 shows a correspondence between different indoor ambient temperature ranges and outdoor ambient temperature ranges corresponding to different general temperature ranges according to one alternative embodiment of the present disclosure. As shown in FIG. 2, the first temperature range is set to satisfy $t<10°$ C., the second temperature range is set to satisfy $10°$ C.$\leq t<20°$ C., the third temperature range is set to satisfy $t\geq 20°$ C., the fourth temperature range is set to satisfy $t\geq 10°$ C., the fifth temperature range is set to satisfy $0°$ C.$\leq t<10°$ C., and the sixth temperature range is set to satisfy $t<0°$ C., wherein an inner ring represents the indoor ambient temperature, an outer ring represents the outdoor ambient temperature, A1, A2, . . . , A9 respectively represent the first range, the second range, . . . , the ninth range, and it should be understood that in the following description, the first range, the second range, . . . , the ninth range are also represented by A1, A2, . . . , A9.

The first determining element 120 is configured to determine whether an evaporator inner-tube temperature satisfies an evaporator inner-tube temperature condition required for entering a cold air prevention mode corresponding to the general temperature range within which the indoor ambient temperature and the outdoor ambient temperature are located, or determine whether a duration, for which a compressor and a four-way valve operate, reaches an operating duration of the compressor and the four-way valve required for entering the cold air prevention mode corresponding to the general temperature range within which the indoor ambient temperature and the outdoor ambient temperature are located, or determine whether a current intensity continuously reaches a first preset current intensity threshold for a predetermined duration.

For different temperature ranges within which the indoor ambient temperature and the outdoor ambient temperature are located, evaporator temperature conditions required for entering a cold air prevention mode are different correspondingly. As at least one alternative embodiment, an evaporator inner-tube temperature condition required for entering a cold air prevention mode corresponding to ranges A2, A3, A5 and A6 is set to satisfy Tevaporator≥35° C., an evaporator inner-tube temperature condition required for entering a cold air prevention mode corresponding to ranges A1, A8 and A9 is set to satisfy Tevaporator≥38° C., an evaporator inner-tube temperature condition required for entering a cold air prevention mode corresponding to a range A4 is set to satisfy Tevaporator≥40° C., and an evaporator inner-tube temperature condition required for entering a cold air prevention mode corresponding to a range A7 is set to satisfy Tevaporator≥43° C.

For different temperature ranges within which the indoor ambient temperature and the outdoor ambient temperature are located, operating durations of a compressor and a four-way valve required for entering the cold air prevention mode are different correspondingly. The correspondence between different indoor ambient temperature ranges and outdoor ambient temperature ranges corresponding to different general temperature ranges shown in FIG. 2 is taken as an example. An operating duration of the compressor and the four-way valve required for entering the cold air prevention mode corresponding to the ranges A1, A4 and A7 is set as 120 s, and an operating duration of the compressor and the four-way valve required for entering the cold air prevention mode corresponding to the ranges A2, A3, A5, A6, A8 and A9 is set as 90 s.

The first determining element 120 determines whether the current intensity reaches a first preset current intensity threshold continuously for a predetermined duration, that is, whether the current intensity is detected continuously to reach a first preset current intensity threshold for a predetermined duration, for example, whether the current intensity is detected continuously for 3 s to reach 10 (first preset current intensity threshold). The first preset current intensity thresholds of different air conditioners are different. The present disclosure adopts the current intensity as a determination condition for entering a cold air prevention mode. By determining the current intensity, safety hazards caused by system overpressure when the system is abnormal in the stage of cold air prevention can be avoided.

The first controlling element 130 is configured to start, if any one determining result of the first determining element is yes, an inner blower fan at a first preset wind speed. When the first determining element 120 determines that any one of the above conditions is satisfied, the inner blower fan is started at a first preset wind speed.

The second determining element 140 is configured to determine, after the inner blower fan is started, whether the evaporator inner-tube temperature satisfies the evaporator inner-tube temperature condition required for exiting the cold air prevention mode corresponding to the general temperature range within which the indoor ambient temperature and the outdoor ambient temperature are located, or determine whether the current intensity continuously reaches a second preset current intensity threshold for a predetermined duration, or determine whether a duration, for which the inner blower fan operates at the first preset wind speed, reaches a first preset duration.

For different temperature ranges within which the indoor ambient temperature and the outdoor ambient temperature are located, evaporator temperature conditions required for exiting a cold air prevention mode are different correspondingly. As at least one alternative embodiment, an evaporator inner-tube temperature condition required for exiting the cold air prevention mode corresponding to ranges A2, A3 and A6 is set to satisfy Tevaporator≥40° C., an evaporator inner-tube temperature condition required for exiting the cold air prevention mode corresponding to ranges A1, A4, A5, A8 and A9 is set to satisfy Tevaporator≥43° C., and an evaporator inner-tube temperature condition required for exiting the cold air prevention mode corresponding to a range A7 is set to satisfy Tevaporator≥45° C.

The second determining element 140 determines whether the current intensity reaches a second preset current intensity threshold continuously for a predetermined duration, that is, whether the current intensity is detected continuously to reach a second preset current intensity threshold for a predetermined duration, for example, whether the current intensity is detected continuously for 3 s to reach 12 (second preset current intensity threshold). The second preset current intensity thresholds of different air conditioners are different.

The second determining element 140 determines whether an operating duration of the inner blower fan at the first preset wind speed reaches a first preset duration, that is, whether the time of entering the cold air prevention mode reaches a first preset duration. The first preset duration is, for example, 5 minutes (minutes).

The second controlling element 150 is further configured to switch, when any one determining result of the second determining element is yes, the inner blower fan to operate at a second preset wind speed, the first preset wind speed being smaller than the second preset wind speed. That is, when the second determining element 140 determines that any one of the above conditions is satisfied, the second controlling element 150 switches the inner blower fan to operate at a second preset wind speed. The second preset wind speed may be a preset wind speed of a system (default wind speed of the system in a heating mode), or may be a wind speed preset by a user according to own needs, and the wind speed refers to an inner blower fan speed, for example, 700 rpm/minutes (r/min). The first preset wind speed is smaller than the second preset wind speed. As at least one alternative embodiment, the wind speed of the air conditioner (inner blower fan speed) may be set as a low wind speed, a medium wind speed and a high wind speed. For example, the low wind speed is set as an inner blower fan speed of 700 r/min, the medium wind speed is set as an inner blower fan speed of 870 r/min, and the high wind speed is set as an inner blower fan speed of 1080 r/min (corresponding to a low wind gear, a medium wind gear and a high wind gear respectively). The first preset wind speed is a low wind speed, and the second preset wind speed may be set by a user. For example, when the user sets the high wind speed, the inner blower fan operates at a low wind speed for a certain duration (first preset duration) and then operates at the high wind speed set by the user, thereby ensuring that the temperature of first outlet air of the air conditioner meets the demand.

Figure 3:
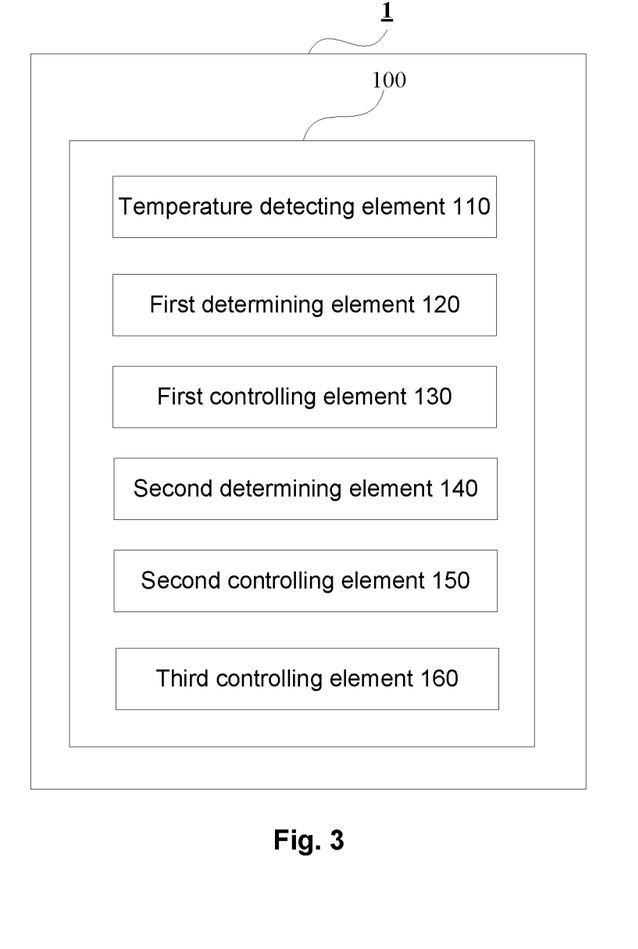
FIG. 3 is a structure block diagram of an air conditioner, and a device for preventing cold air during heating of the air conditioner according to another embodiment of the present disclosure.

FIG. 3 is a structure block diagram of an air conditioner, and a device for preventing cold air during heating of the air conditioner according to another embodiment of the present disclosure. As shown in FIG. 3, based on the above embodiment, the device for preventing cold air during heating on an air conditioner further includes a third controlling element 160. The third controlling element 160 is configured to drive, after heating is started, an air deflector to a first preset position. Further, the third controlling element 160 is further configured to: drive, after the inner blower fan is started, the air deflector to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or the current intensity continuously reaches a second preset current intensity threshold for a predetermined duration, or a duration, for which the inner blower fan operates at the first preset wind speed, reaches a second preset duration.

The first preset position is preferably the highest position to the air deflector. After the compressor is started in the heating mode, the third controlling element 160 first drives the air deflector to the highest position. After the inner blower fan is started, the third controlling element 160 drives the air deflector to a second preset position when one of the above conditions is satisfied, where the second preset position may be an alignment position of the air deflector, or may be any preset position. For example, the air deflector is aligned when exiting the cold air prevention mode. The second preset duration and the first preset duration may be the same or may be different. The intelligent control of the air deflector is realized when cold air prevention during heating of the air conditioner.

The method for preventing cold air during heating on an air conditioner of the present disclosure will be described below with the accompanying drawings.

Figure 4:
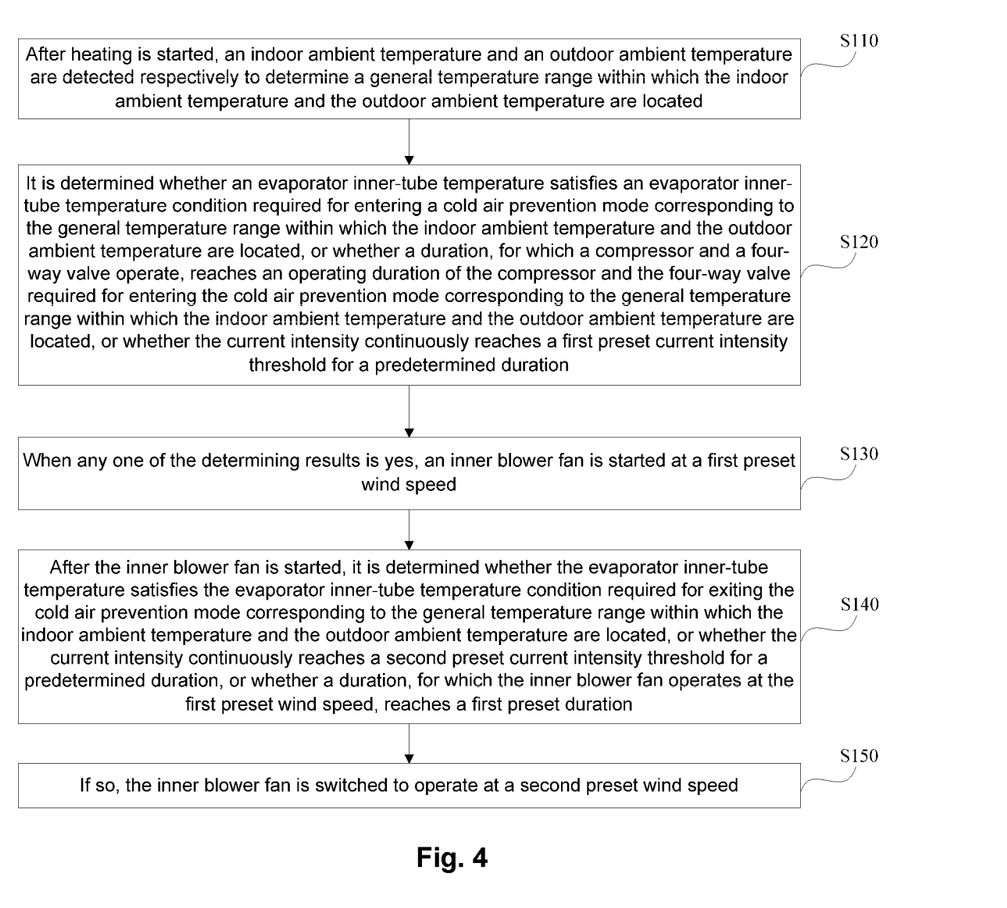
FIG. 4 is a flowchart of a method for preventing cold air during heating for an air conditioner according to an embodiment of the present disclosure.

FIG. 4 is a flowchart of the method according to an embodiment of the present disclosure. As shown in FIG. 4, the method for preventing cold air during heating for an air conditioner includes step S110, step S120, step S130, step S140, and step S150.

At step S110, after heating is started, an indoor ambient temperature and an outdoor ambient temperature are detected respectively to determine a general temperature range within which the indoor ambient temperature and the outdoor ambient temperature are located.

As at least one alternative embodiment, the temperature detecting element 110 may detect an outdoor ambient temperature by an outer ring thermal bulb of the air conditioner. For example, variable frequency air conditioners generally have an outer ring thermal bulb for measuring the outdoor ambient temperature. In another alternative embodiment, the temperature detecting element 110 detects a condenser intermediate temperature, and uses the condenser intermediate temperature as the outdoor ambient temperature. Since the condenser intermediate temperature is close to the outdoor ambient temperature at the time of starting up, for an air conditioner without an outer ring thermal bulb, the condenser intermediate temperature can be used as the outdoor ambient temperature. For example, for a fixed-frequency air conditioner without an outer ring thermal bulb, the condenser intermediate temperature may be detected as the outdoor ambient temperature. The condenser intermediate temperature may be measured by a thermal bulb.

As at least one alternative embodiment, the indoor ambient temperature and the outdoor ambient temperature are detected after starting up for a predetermined duration, so as to avoid the impact of a compressor phase current, and prevent a program from entering incorrectly. When it is detected that the indoor ambient temperature and the outdoor ambient temperature are respectively located within an indoor ambient temperature range and an outdoor ambient temperature range corresponding to any one general temperature range, it is determined that the indoor ambient temperature and the outdoor ambient temperature are located within the general temperature range. Multiple general temperature ranges may be preset. The step of setting multiple general temperature ranges may include that: multiple indoor ambient temperature ranges and multiple outdoor ambient temperature ranges are set, and each indoor ambient temperature range corresponds to different outdoor ambient temperature ranges respectively to form the multiple general temperature ranges.

As at least one alternative embodiment, the indoor ambient temperature range is set as a first temperature range, a second temperature range, and a third temperature range, respectively, the outdoor ambient temperature range is set as a fourth temperature range, a fifth temperature range and a sixth temperature range, respectively, and the formed multiple general temperature ranges are a first range, a second range, a third range, a fourth range, a fifth range, a sixth range, a seventh range, an eighth range, and a ninth range, respectively.

Corresponding to the first range, the indoor ambient temperature range is within the first temperature range, and the outdoor ambient temperature range is within the fourth temperature range.

Corresponding to the second range, the indoor ambient temperature range is within the second temperature range, and the outdoor ambient temperature range is within the fourth temperature range.

Corresponding to the third range, the indoor ambient temperature range is within the third temperature range, and the outdoor ambient temperature range is within the fourth temperature range.

Corresponding to the fourth range, the indoor ambient temperature range is within the first temperature range, and the outdoor ambient temperature range is within the fifth temperature range.

Corresponding to the fifth range, the indoor ambient temperature range is within the second temperature range, and the outdoor ambient temperature range is within the fifth temperature range.

Corresponding to the sixth range, the indoor ambient temperature range is within the third temperature range, and the outdoor ambient temperature range is within the fifth temperature range.

Corresponding to the seventh range, the indoor ambient temperature range is within the first temperature range, and the outdoor ambient temperature range is within the sixth temperature range.

Corresponding to the eighth range, the indoor ambient temperature range is within the second temperature range, and the outdoor ambient temperature range is within the sixth temperature range.

Corresponding to the ninth range, the indoor ambient temperature range is within the third temperature range, and the outdoor ambient temperature range is within the sixth temperature range.

FIG. 2 is a table showing a correspondence between different indoor ambient temperature ranges and outdoor ambient temperature ranges corresponding to different general temperature ranges according to one alternative embodiment of the present disclosure. As shown in FIG. 2, the first temperature range is set to satisfy t<10° C., the second temperature range is set to satisfy 10° C.≤t<20° C., the third temperature range is set to satisfy t≥20° C., the fourth temperature range is set to satisfy 0° C., the fifth temperature range is set to satisfy 0° C.≤t<10° C., and the sixth temperature range is set to satisfy t<0° C., wherein an inner ring represents the indoor ambient temperature, an outer ring represents the outdoor ambient temperature, A1, A2, . . . , A9 respectively represent the first range, the second range, . . . , the ninth range, and it should be understood that in the following description, the first range, the second range, . . . , the ninth range are also represented by A1, A2, . . . , A9.

At step S120, it is determined whether an evaporator inner-tube temperature satisfies an evaporator inner-tube temperature condition required for entering a cold air prevention mode corresponding to the general temperature range within which the indoor ambient temperature and the outdoor ambient temperature are located, or whether a duration, for which a compressor and a four-way valve operate, reaches an operating duration of the compressor and the four-way valve required for entering the cold air prevention mode corresponding to the general temperature range within which the indoor ambient temperature and the outdoor ambient temperature are located, or whether a current intensity continuously reaches a first preset current intensity threshold for a predetermined duration.

For different temperature ranges within which the indoor ambient temperature and the outdoor ambient temperature are located, the evaporator temperature conditions required for entering a cold air prevention mode are different correspondingly. The correspondence, as shown in FIG. 2, between different indoor ambient temperature ranges and outdoor ambient temperature ranges corresponding to different general temperature ranges is taken as an example. An evaporator inner-tube temperature condition required for entering a cold air prevention mode corresponding to ranges A2, A3, A5 and A6 is set to satisfy Tevaporator≥35° C., an evaporator inner-tube temperature condition required for entering a cold air prevention mode corresponding to ranges A1, A8 and A9 is set to satisfy Tevaporator≥38° C., an evaporator inner-tube temperature condition required for entering a cold air prevention mode corresponding to a range A4 is set to satisfy Tevaporator≥40° C., and an evaporator inner-tube temperature condition required for entering a cold air prevention mode corresponding to a range A7 is set to satisfy Tevaporator≥43° C.

For different temperature ranges within which the indoor ambient temperature and the outdoor ambient temperature are located, the operating durations of a compressor and a four-way valve required for entering the cold air prevention mode are different correspondingly. The correspondence between different indoor ambient temperature ranges and outdoor ambient temperature ranges corresponding to different general temperature ranges shown in FIG. 2 is taken as an example. An operating duration of the compressor and the four-way valve required for entering the cold air prevention mode corresponding to the ranges A1, A4 and A7 is set as 120 s, and an operating duration of the compressor and the four-way valve required for entering the cold air prevention mode corresponding to the ranges A2, A3, A5, A6, A8 and A9 is set as 90 s.

It is determined whether the current intensity reaches a first preset current intensity threshold continuously for a predetermined duration, that is, whether the current intensity is monitored continuously to reach a first preset current intensity threshold for a predetermined duration, for example, whether the current intensity is detected continuously for 3 s to reach 10 (first preset current intensity threshold). The first preset current intensity thresholds of different air conditioners are different. The present disclosure adopts the current intensity as one determination condition for entering a cold air prevention mode. Safety hazards caused by system overpressure when the system is abnormal in the stage of cold air prevention can be avoided.

At step S130, When any one of the determining results is yes, an inner blower fan is started at a first preset wind speed.

When the determining result of any of the above determinations is yes, the cold air prevention mode can be entered. That is, when any one of the above conditions is satisfied, the inner blower fan is started at a first preset wind speed, where the first preset wind speed is a low wind speed.

At step S140, after the inner blower fan is started, it is determined whether the evaporator inner-tube temperature satisfies the evaporator inner-tube temperature condition required for exiting the cold air prevention mode corresponding to the general temperature range within which the indoor ambient temperature and the outdoor ambient temperature are located, or whether the current intensity continuously reaches a second preset current intensity threshold for a predetermined duration, or whether a duration, for which the inner blower fan operates at the first preset wind speed, reaches a first preset duration.

For different temperature ranges within which the indoor ambient temperature and the outdoor ambient temperature are located, the evaporator temperature conditions required for entering a cold air prevention mode are different correspondingly. The correspondence, as shown in FIG. 2, between different indoor ambient temperature ranges and outdoor ambient temperature ranges corresponding to different general temperature ranges is taken as an example. An evaporator inner-tube temperature condition required for exiting the cold air prevention mode corresponding to ranges A2, A3 and A6 is set to satisfy Tevaporator≥40° C., an evaporator inner-tube temperature condition required for exiting the cold air prevention mode corresponding to ranges A1, A4, A5, A8 and A9 is set to satisfy Tevaporator≥43° C., and an evaporator inner-tube temperature condition required for exiting the cold air prevention mode corresponding to a range A7 is set to satisfy Tevaporator≥45° C.

It is determined whether the current intensity reaches a second preset current intensity threshold continuously for a predetermined duration, that is, whether the current intensity is detected continuously to reach a second preset current intensity threshold for a predetermined duration, for example, whether the current intensity is detected continuously for 3 s to reach 12 (second preset current intensity threshold). The second preset current intensity thresholds of different air conditioners are different.

It is determined whether an operating duration of the inner blower fan at the first preset wind speed reaches a first preset duration, that is, whether the duration of entering the cold air prevention mode reaches a first preset duration. The first preset duration is, for example, 5 minutes (minutes).

At step S150, if so, the inner blower fan is switched to operate at a second preset wind speed.

When the determining result of any of the above determinations is yes, the cold air prevention mode can be exited. That is, when the determination satisfies any of the above conditions, the inner blower fan is switched to operate at a second preset wind speed. The second preset wind speed may be a preset wind speed of a system (default wind speed of the system in a heating mode), or may be a wind speed preset by a user according to own needs, and the wind speed refers to an inner blower fan speed, for example, 700 rpm/minutes (r/min). The first preset wind speed is smaller than the second preset wind speed. As at least one alternative embodiment, the wind speed of the air conditioner (inner blower fan speed) may be set as a low wind speed, a medium wind speed and a high wind speed. For example, the low wind speed is set as an inner blower fan speed of 700 r/min, the medium wind speed is set as an inner blower fan speed of 870 r/min, and the high wind speed is set as an inner blower fan speed of 1080 r/min (corresponding to a low wind gear, a medium wind gear and a high wind gear respectively). The first preset wind speed is a low wind speed, and the second preset wind speed may be set by a user. For example, when the user sets the high wind speed, the inner blower fan operates at a low wind speed for a certain duration (first preset duration) and then operates at the high wind speed set by the user, thereby ensuring that the temperature of first outlet air of the air conditioner meets the demand.

Figure 5:
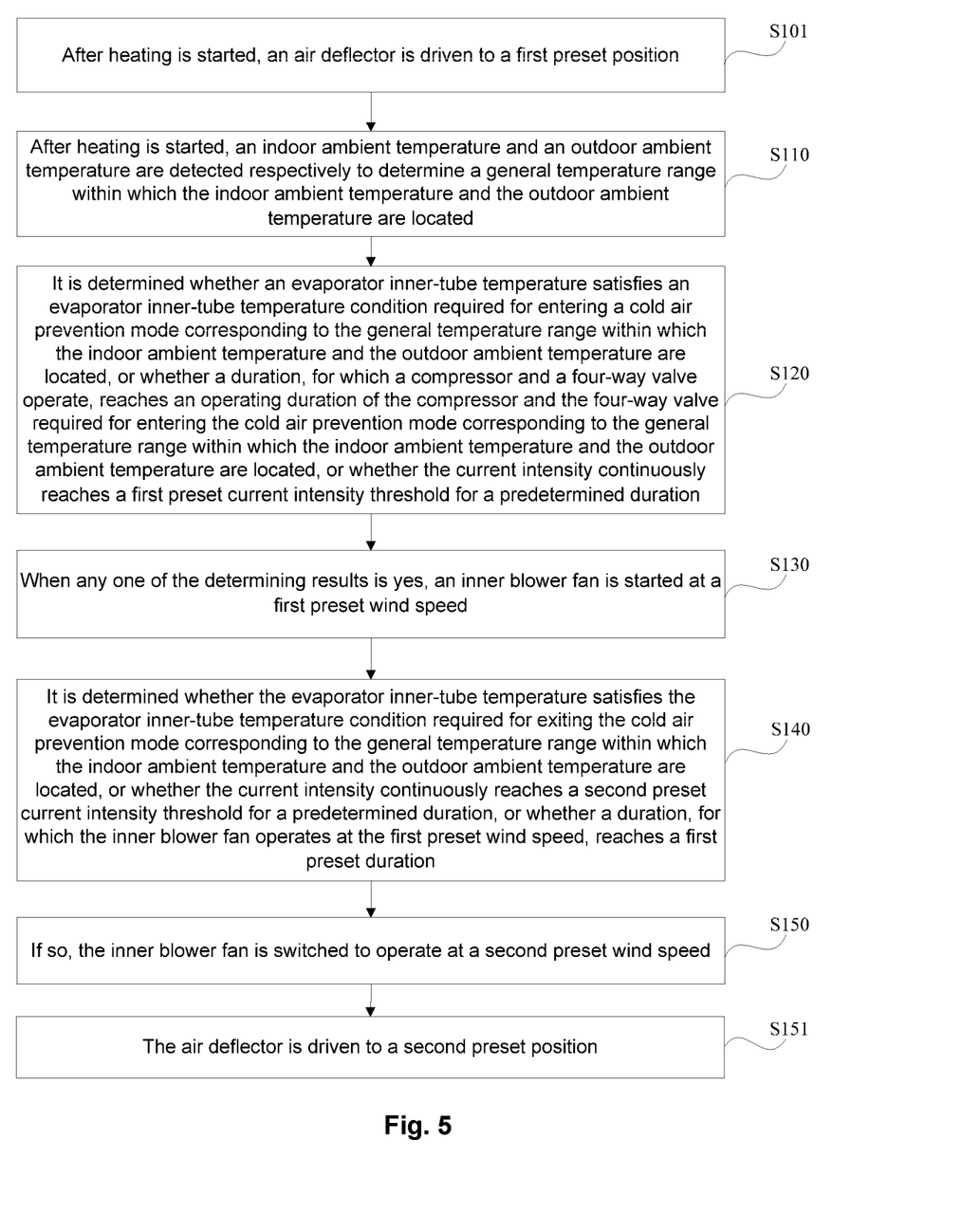
FIG. 5 is a flowchart of a method for preventing cold air during heating for an air conditioner according to another embodiment of the present disclosure.

FIG. 5 is a flowchart of a method for preventing cold air during heating on an air conditioner according to another embodiment of the present disclosure; and based on the above embodiment, as shown in FIG. 5, the method of the present disclosure further includes step 101 and step S151.

At step S101, after heating is started, an air deflector is driven to a first preset position.

This step may be performed before step S110, that is, in the heating mode, the air deflector is first driven to the first preset position after the compressor is started. The first preset position is preferably the highest position to the air deflector, that is, the wind direction is obliquely upward.

At step S151, after the inner blower fan is started, the air deflector is driven to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or the current intensity continuously reaches a second preset current intensity threshold for a predetermined duration, or a duration, for which the inner blower fan operates at the first preset wind speed, reaches a second preset duration.

After the inner blower fan is started, the air deflector is driven to a second preset position, where the second preset position may be an alignment position of the air deflector, or may be any preset position. For example, the air deflector is aligned when exiting the cold air prevention mode, so as to ensure the comfort of first outlet air. The second preset duration and the first preset duration may be the same or may be different. The intelligent control of the air deflector is realized when cold air prevention during heating of the air conditioner.

The air conditioner, and the device and method for preventing cold air during heating of the air conditioner according to the present disclosure are described above. According to the above solution of the present disclosure, the timing of entering a cold air prevention mode is determined, by integrating conditions such as an evaporator inner-tube temperature, a compressor operating time and current intensity, according to a general temperature range within which an indoor ambient temperature and an outdoor ambient temperature are located, and the timing of entering the cold air prevention mode of a system, a system pressure and an outlet air temperature are optimized. By taking the current intensity as one determining condition for entering the cold air prevention mode, safety hazards caused by system overpressure when the system is abnormal in the stage of cold air prevention can be avoided. Moreover, the timing of exiting the cold air prevention mode and the timing of aligning an air deflector are determined by integrating the conditions such as the evaporator inner-tube temperature, the compressor operating time and the current intensity, and a comfortable heating experience can be provided for a user.

Figure 6:
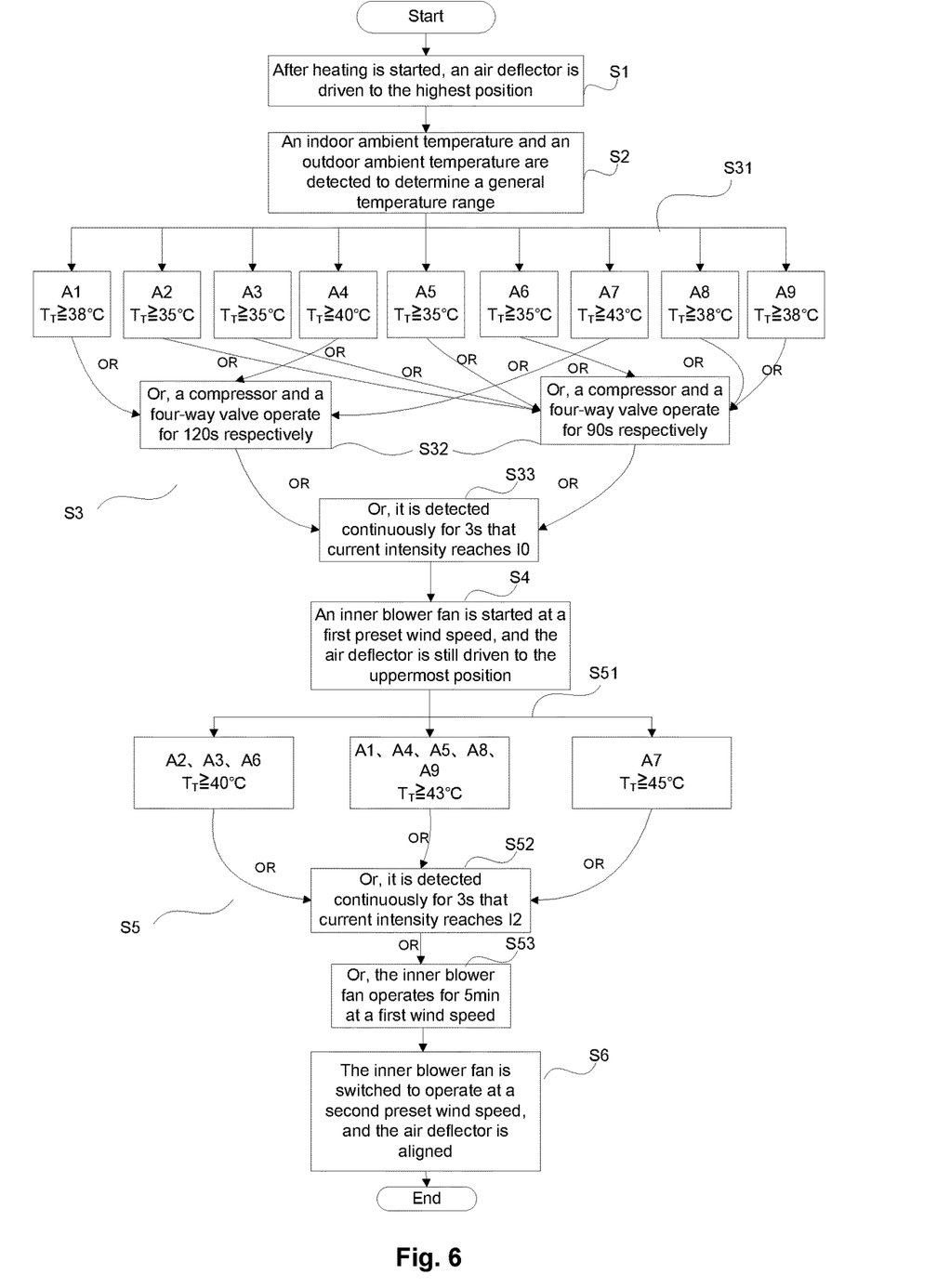
FIG. 6 is a flowchart of a method for preventing cold air during heating for an air conditioner according to a specific embodiment of the present disclosure.

FIG. 6 is a flowchart of a method for preventing cold air during heating on an air conditioner according to one alternative embodiment of the present disclosure. The method for preventing cold air during heating on an air conditioner according to the alternative embodiment of the present disclosure will be described below as shown in FIG. 6.

Different indoor ambient temperature ranges and outdoor ambient temperature ranges corresponding to different general temperature ranges are as shown in FIG. 2. A predetermined delay time is 6 s (second), and an evaporator inner-tube temperature condition required for entering a cold air prevention mode corresponding to ranges A2, A3, A5 and A6 is set to satisfy Tevaporator≥35° C., an evaporator inner-tube temperature condition required for entering a cold air prevention mode corresponding to ranges A1, A8 and A9 is set to satisfy Tevaporator≥38° C., an evaporator inner-tube temperature condition required for entering a cold air prevention mode corresponding to a range A4 is set to satisfy Tevaporator≥40° C., an evaporator inner-tube temperature condition required for entering a cold air prevention mode corresponding to a range A7 is set to satisfy Tevaporator≥43° C., and an operating duration of the compressor and the four-way valve required for entering the cold air prevention mode corresponding to the ranges A1, A4 and A7 is 120 s, and an operating duration of the compressor and the four-way valve required for entering the cold air prevention mode corresponding to the ranges A2, A3, A5, A6, A8 and A9 is 90 s. The first preset duration is 5 min (minutes), and the second preset duration is the same as the first preset duration. The current intensity is detected continuously for a predetermined duration of 3 s (second), the first preset current intensity threshold is 10, and the second preset current intensity threshold is 12. An evaporator inner-tube temperature condition required for exiting the cold air prevention mode corresponding to ranges A2, A3 and A6 is set to satisfy Tevaporator≥40° C., an evaporator inner-tube temperature condition required for exiting the cold air prevention mode corresponding to ranges A1, A4, A5, A8 and A9 is set to satisfy Tevaporator≥43° C., and an evaporator inner-tube temperature condition required for exiting the cold air prevention mode corresponding to a range A7 is set to satisfy Tevaporator≥45° C. As shown in FIG. 6, the method specifically includes the steps as follows.

At step S1, after heating is started, an air deflector is driven to the highest position.

At step S2, an indoor ambient temperature and an outdoor ambient temperature are detected to determine a general temperature range.

After delaying for 6 s, the indoor ambient temperature and the outdoor ambient temperature are detected to determine a general temperature range within which the indoor ambient temperature and the outdoor ambient temperature are located. A general temperature range A1 within which the indoor ambient temperature and the outdoor ambient temperature are located is taken as an example below.

At step S3, it is determined whether a condition of entering cold air prevention is satisfied, including the following determining conditions:

S31: whether an operating duration of a compressor and a four-way valve reaches an operating duration required for entering cold air prevention; or, S32: whether an evaporator inner-tube temperature satisfies a temperature condition required for entering cold air prevention; or, S33: whether current intensity continuously reaches a first preset current intensity threshold for a predetermined time.

When any one of S31, S32, and S33 is satisfied (determination is in no particular order), the determining result is yes.

Corresponding to the range A1, it is determined whether the operating duration of the compressor and the four-way valve reaches 120 s, or whether the evaporator inner-tube temperature satisfies Tevaporator≥8° C., or whether it is detected continuously for 3 s that the current intensity satisfies I≥I0.

At step S4, when the determining result is yes, an inner blower fan is started at a first preset wind speed (low wind speed).

At step S5, it is determined whether a condition of exiting cold air prevention is satisfied, including the following determining conditions:

S51: whether the evaporator inner-tube temperature satisfies a temperature condition required for exiting cold air prevention; or, S52: whether the current intensity continuously reaches a second preset current intensity threshold for a predetermined time; or, S53: an operating duration of the inner blower fan reaches a first preset duration. When any one of S51, S52, and S53 is satisfied (determination is in no particular order), the determining result is yes.

After the inner blower fan is put into operation, the evaporator inner-tube temperature and the current intensity are continuously monitored. Corresponding to the range A1, it is determined whether the evaporator temperature satisfies Tevaporator≥43° C., or whether the current intensity satisfies I≥I2, or whether the operating duration of the inner blower fan at a low wind speed reaches 5 min.

At step S6, when any one of the above determinations is satisfied, the inner blower fan is switched to operate at a second preset wind speed, and the air deflector is aligned.

The step of determining that a general temperature range is another temperature range (A2 to A9) is similar to the range A1, which may be referred to the determination process of the range A1 in conjunction with FIG. 6, and will not be described herein.

It is to be noted that the embodiments of the device portion and the method portion in the present disclosure may be referred to each other. The embodiments of the present disclosure and the features of the embodiments may be combined with each other without conflict. For example, the method is implemented in the device.

The above is only a preferred embodiment of the present disclosure, and is not intended to limit the present disclosure in any way. Any simple amendments, equivalent changes and modifications made to the above embodiments in accordance with the technical spirit of the present disclosure are still within the scope of the technical solutions of the present disclosure.

What is claimed is:

1. A device for preventing cold air during heating on an air conditioner, comprising a hardware processor configured to execute program elements stored on a memory, the program elements comprising:

a temperature detecting element, configured to detect, after heating is started, an indoor ambient temperature and an outdoor ambient temperature respectively to determine a general temperature range within which the indoor ambient temperature and the outdoor ambient temperature are located;

a first determining element, configured to, determine whether an evaporator inner-tube temperature satisfies an evaporator inner-tube temperature condition required for entering a cold air prevention mode corresponding to the general temperature range within which the indoor ambient temperature and the outdoor ambient temperature are located, or determine whether a duration, for which a compressor and a four-way valve operate, reaches an operating duration of the compressor and the four-way valve, required for entering the cold air prevention mode corresponding to the general temperature range within which the indoor ambient temperature and the outdoor ambient temperature are located, or determine whether a current intensity continuously reaches a first preset current intensity threshold for a predetermined duration;

a first controlling element, configured to start, when any one determining result of the first determining element is yes, an inner blower fan at a first preset wind speed;

a second determining element, configured to determine, after the inner blower fan is started, whether the evaporator inner-tube temperature satisfies the evaporator inner-tube temperature condition required for exiting the cold air prevention mode corresponding to the general temperature range within which the indoor ambient temperature and the outdoor ambient temperature are located, or determine whether the current intensity continuously reaches a second preset current intensity threshold for a predetermined duration, or determine whether a duration, for which the inner blower fan operates at the first preset wind speed, reaches a first preset duration;

a second controlling element, configured to switch, when any one determining result of the second determining element is yes, the inner blower fan to operate at a second preset wind speed, the first preset wind speed being smaller than the second preset wind speed; and the device further comprising: a setting element, configured to set a plurality of general temperature ranges, the setting element being further configured to: set a plurality of indoor ambient temperature ranges and a plurality of outdoor ambient temperature ranges, and set each indoor ambient temperature range to correspond to different outdoor ambient temperature ranges respectively to form the plurality of general temperature ranges.

2. The device as claimed in claim 1, wherein the temperature detecting element does not detect the indoor ambient temperature and the outdoor ambient temperature until a predetermined delay time has elapsed after starting up of the air conditioner.

3. The device as claimed in claim 1, further comprising:

a third controlling element, configured to drive, after heating is started, an air deflector to a first preset position.

4. The device as claimed in claim 3, wherein the third controlling element is further configured to:

drive, after the inner blower fan is started, the air deflector to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or the current intensity continuously reaches a second preset current intensity threshold for a predetermined duration, or a duration, for which the inner blower fan operates at the first preset wind speed, reaches a second preset duration.

5. A method for preventing cold air during heating on an air conditioner, comprising:

after heating is started, detecting an indoor ambient temperature and an outdoor ambient temperature respectively to determine a general temperature range within which the indoor ambient temperature and the outdoor ambient temperature are located;

determining whether an evaporator inner-tube temperature satisfies an evaporator inner-tube temperature condition required for entering a cold air prevention mode corresponding to the general temperature range within which the indoor ambient temperature and the outdoor ambient temperature are located, or determining whether a duration, for which a compressor and a four-way valve operate, reaches an operating duration of the compressor and the four-way valve, required for entering the cold air prevention mode corresponding to the general temperature range within which the indoor ambient temperature and the outdoor ambient temperature are located, or determining whether a current intensity continuously reaches a first preset current intensity threshold for a predetermined duration;

when any one determining result is yes, starting an inner blower fan at a first preset wind speed;

after the inner blower fan is started, determining whether the evaporator inner-tube temperature satisfies the evaporator inner-tube temperature condition required for exiting the cold air prevention mode corresponding to the general temperature range within which the indoor ambient temperature and the outdoor ambient temperature are located, or determining whether the current intensity continuously reaches a second preset current intensity threshold for a predetermined duration, or determining whether a duration, for which the inner blower fan operates at the first preset wind speed, reaches a first preset duration;

if so, switching the inner blower fan to operate at a second preset wind speed, the first preset wind speed being smaller than the second preset wind speed; and the method further comprising: setting a plurality of general temperature ranges, comprising:

setting a plurality of indoor ambient temperature ranges and a plurality of outdoor ambient temperature ranges, and setting each indoor ambient temperature range to correspond to different outdoor ambient temperature ranges respectively to form the plurality of general temperature ranges.

6. The method as claimed in claim 5, wherein the indoor ambient temperature and the outdoor ambient temperature are not detected until a predetermined delay time has elapsed after starting up of the air conditioner.

7. The method as claimed in claim 5, further comprising:
driving, after heating is started, an air deflector to a first preset position.

8. The method as claimed in claim 7, further comprising:
driving, after the inner blower fan is started, the air deflector to a second preset position when the evaporator inner-tube temperature satisfies the evaporator inner-tube temperature condition required for exiting the cold air prevention mode corresponding to the general temperature range within which the indoor ambient temperature and the outdoor ambient temperature are located, or it is continuously detected, within a predetermined duration, that the current intensity reaches a second preset current intensity threshold, or a duration, for which the inner blower fan operates at the first preset wind speed, reaches a second preset duration.

9. An air conditioner, comprising the device as claimed in claim 1.

10. An air conditioner, comprising the device as claimed in claim 2.

11. An air conditioner, comprising the device as claimed in claim 3.

12. An air conditioner, comprising the device as claimed in claim 4.

* * * * *